United States Patent

Davis

[11] Patent Number: 5,833,013
[45] Date of Patent: Nov. 10, 1998

[54] GRASS BRUSH VEHICLE

[75] Inventor: Michael E. Davis, Indianapolis, Ind.

[73] Assignee: Greensgroomer Worldwide, Inc., Indianapolis, Ind.

[21] Appl. No.: 845,618

[22] Filed: Apr. 25, 1997

[51] Int. Cl.⁶ .................................................. A01B 95/00
[52] U.S. Cl. .................. 172/612; 172/684.5; 172/445.1; 56/DIG. 12
[58] Field of Search ............................. 15/21.2, 104.92; 172/22, 30, 612, 684.5, 112, 189; 56/16.4 K, 400.14, 400.15, DIG. 12

[56] References Cited

U.S. PATENT DOCUMENTS

| | | | |
|---|---|---|---|
| 4,596,290 | 6/1986 | Bedney | 172/311 |
| 4,723,787 | 2/1988 | Hadtey et al. | 172/311 |
| 4,881,603 | 11/1989 | Hartman | 172/313 X |
| 4,896,485 | 1/1990 | Gondy | 56/6 |
| 4,989,676 | 2/1991 | Rogers | 172/684.5 X |
| 5,018,587 | 5/1991 | Gandrud et al. | 172/612 |
| 5,265,898 | 11/1993 | Houck | 172/311 X |

OTHER PUBLICATIONS

Greens Groomer sales brochure Exhibits A–C (no date).

*Primary Examiner*—Michael J. Carone
*Assistant Examiner*—Robert Pezzuto
*Attorney, Agent, or Firm*—Woodard, Emhardt, Naughton, Moriarty & McNett

[57] ABSTRACT

A brush for grooming golf greens and fairways. Three identical brush devices are removably connected together with two of the brush devices located laterally outward of the middle brush device. When not in use and in transport, the three brush units may be aligned in single file for towing along a narrow path. Each brush device includes a plurality of depending brushes removably mounted to a rectangular frame. The brushes are arranged to assure even grass grooming and even brush wear. A winch with cable is mounted to the frame and is operable to raise and lower wheels to support the brush device when not in use.

9 Claims, 8 Drawing Sheets

GRASS BRUSH VEHICLE

BACKGROUND OF THE INVENTION

1. Field of the Invention

This invention is in the field of grass brushes.

2. Description of the Prior Art

Golf greens are maintained by applying a level of sand periodically atop the grass with a brush then being used to force the sand down between the blades of grass. The prior art includes a wheeled frame having a number of brushes depending therefrom with the frame then being towed by a vehicle back and forth across the green. The brushes are also used to groom fairway grass.

The cost of a golf green can exceed a million dollars per green and thus caretakers are very careful in the type of equipment used to maintain the green. Relatively small brush vehicles are used to minimize the weight of the vehicle and any tracks left by the vehicle. In many cases, the greens are quite large requiring considerable time to work the sand downwardly between blades of grass. Thus, there is a desire to have a relatively wide brush vehicle to reduce the amount of time for dressing the green. Relatively wide brush vehicles present further problems in that they are not easily transported along golf paths and the small bridges typically found on golf courses. I have therefore designed a light-weight brush vehicle having a relatively wide lateral brushing reach which can be easily collapsed into a narrow width vehicle during transport. Disclosed herein is such a brush vehicle.

In order to efficiently work the sand downward into the grass, it is desirable to contact each blade of grass with multiple brushes during a single sweep of the brush across the green. The vehicle disclosed herein has a pattern of brushes to ensure each blade beneath the vehicle brush frame is contacted by three separate brushes during a single sweep. Prior art brushes were designed to contact each blade by three separate brushes but only at certain locations beneath the brush frame thereby providing a non-uniform brushing beneath the entire brush frame.

The prior art brushing vehicles do not pull in a straight line across the green and are not adaptable to pull in both the forward and reverse directions while achieving the same result. Disclosed herein is a brush vehicle having a balanced pull and a uniform brush result. An equal number of brushes are positioned on either side of the longitudinal axis of the vehicle thereby also providing an equal contact area between the brushes and the grass on either side of the longitudinal axis. Tabs are provided on the front end and rear end of the brush frame allowing the draw bar to be attached to either side. The pattern of brushes is optimized by reducing the number of feet of brush required while also minimizing the number of sizes of brushes.

The vehicle disclosed herein includes a two position drawbar to allow the operator the option of moving the brush frame further back from the pulling vehicle so that the frame may be pulled behind a drop spreader for one pass service thereby reducing cost, time, and wheeled traffic on the green.

SUMMARY OF THE INVENTION

One embodiment of the present invention is a brush vehicle for grooming blades of grass comprising a main frame forming a brush holder and including a front end and a rear end with a longitudinal axis extending therebetween. A plurality of brushes are mounted to the brush holder and extend downwardly engageable with the grass. The brushes are arranged in a first pattern on a first side of the axis and in a second pattern on a second side of the axis. The first pattern and the second pattern have an equal number of the brushes allowing even brush wear and even grass grooming without turning moments applied to the vehicle when the vehicle is moved equally in either direction along the axis.

It is an object of the present invention to provide a new and improved device for brushing a golf green and fairway.

A further object of the present invention is to provide a grass brush vehicle having maximum lateral width while being collapsed into a portable vehicle having a narrow width.

A further object of the present invention is to provide a brush vehicle for grooming blades of grass allowing even brush wear and even grass grooming.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
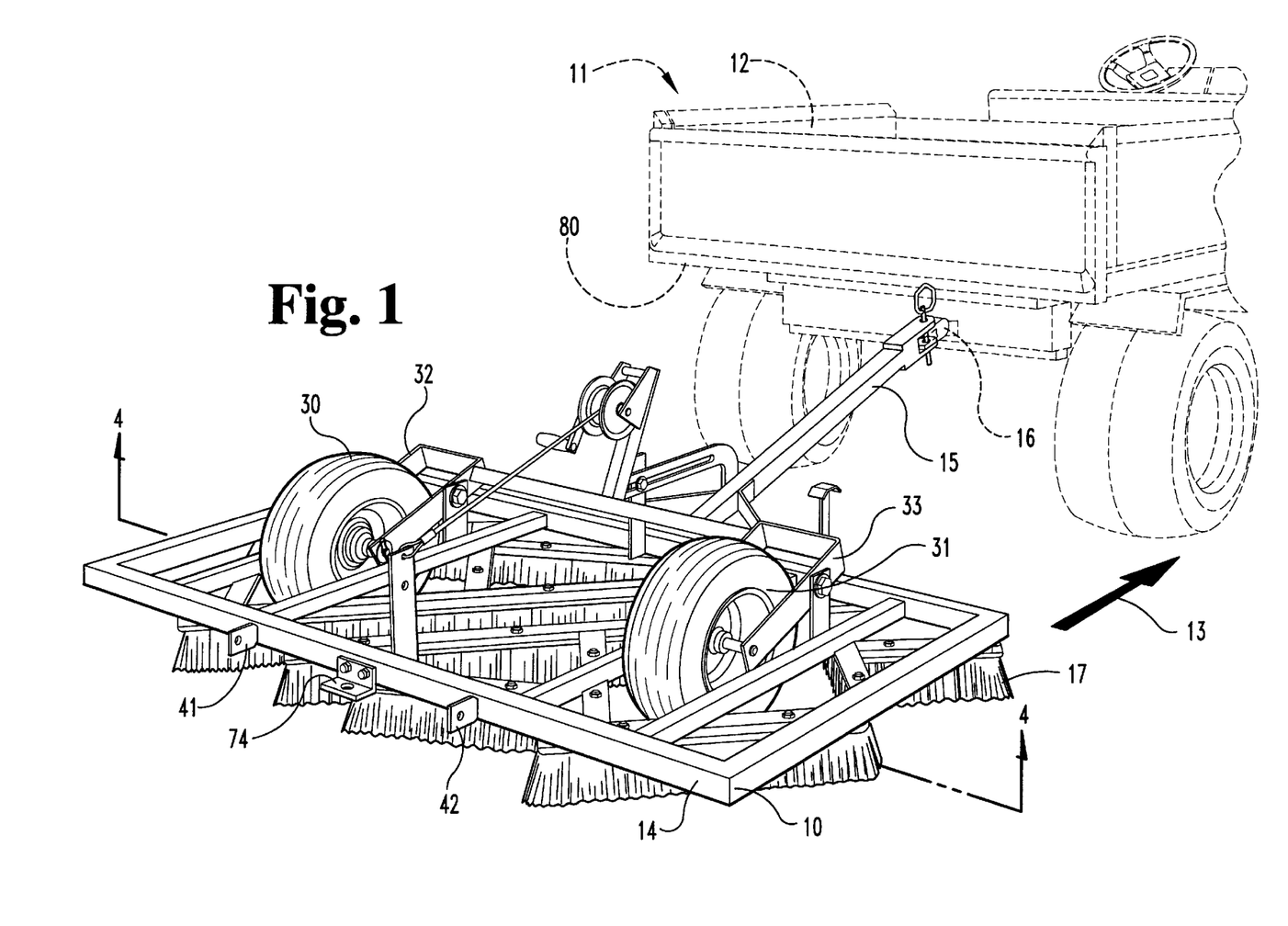
FIG. 1 is a perspective rear view of a grass brush vehicle attached to a powered vehicle.

Referring now more particularly to FIG. 1, there is shown a brush vehicle 10 removably attached to and towed by a conventional powered vehicle 11. Vehicle 11 may be gasoline powered or battery operated cart or tractor and includes a rear receptacle 12 for holding a variety of objects and materials including sand. Brush vehicle 10 includes a rectangular frame 14 attached by means of a tow bar 15, in turn, removably attached to a conventional trailer hitch 16 provided on the rear of vehicle 11. Vehicles 10 and 11 are operable to move across a golf green or fairway in the direction of arrow 13. Attached to and depending from frame 14 or a plurality of brushes 17 which brush or sweep across the blades of grass located beneath the frame 14 thereby grooming the grass.

Figure 4:
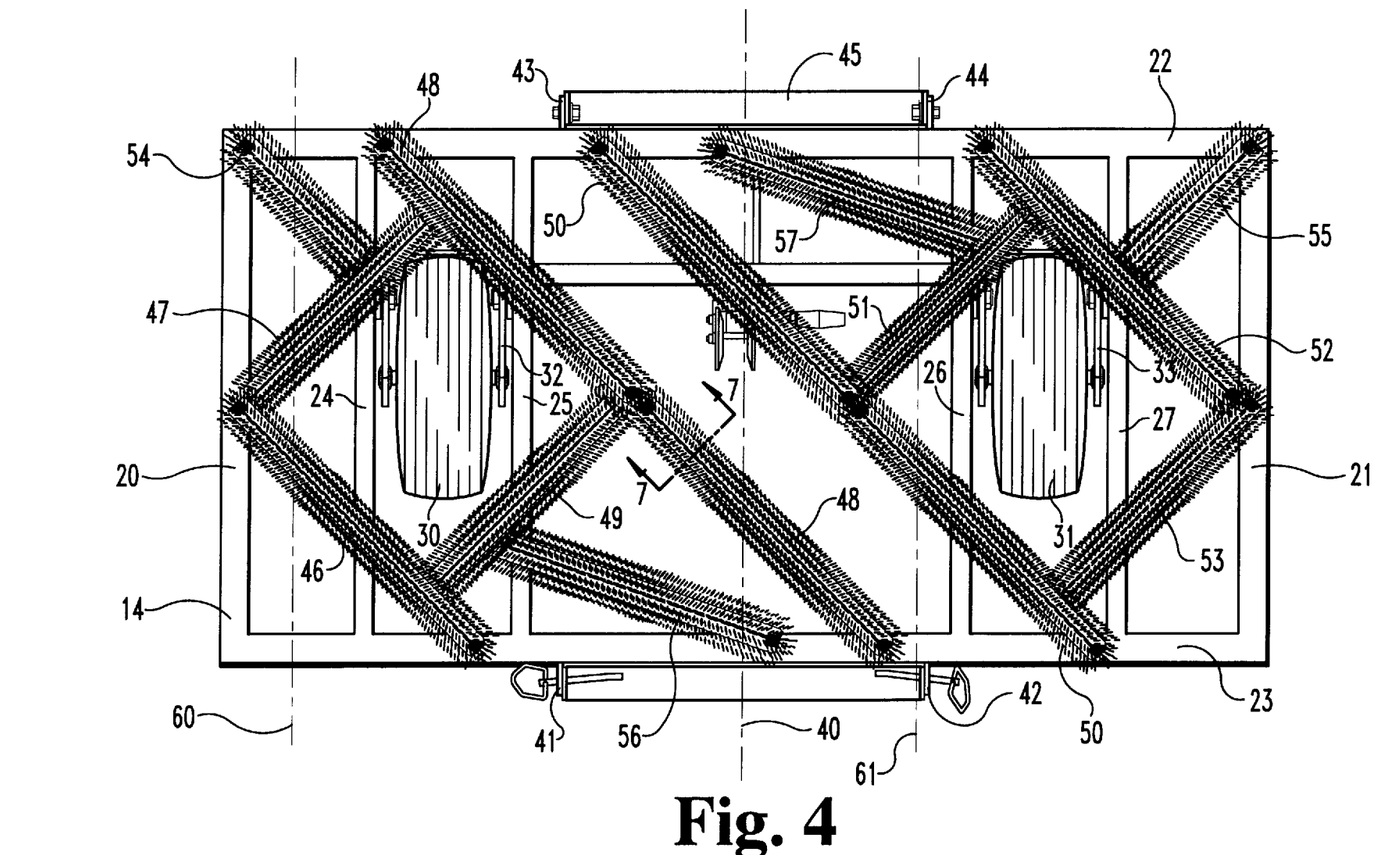
FIG. 4 is a bottom view of a brush frame taken along a line and viewed in the direction of arrows 4—4 of FIG. 1.
Figure 5:
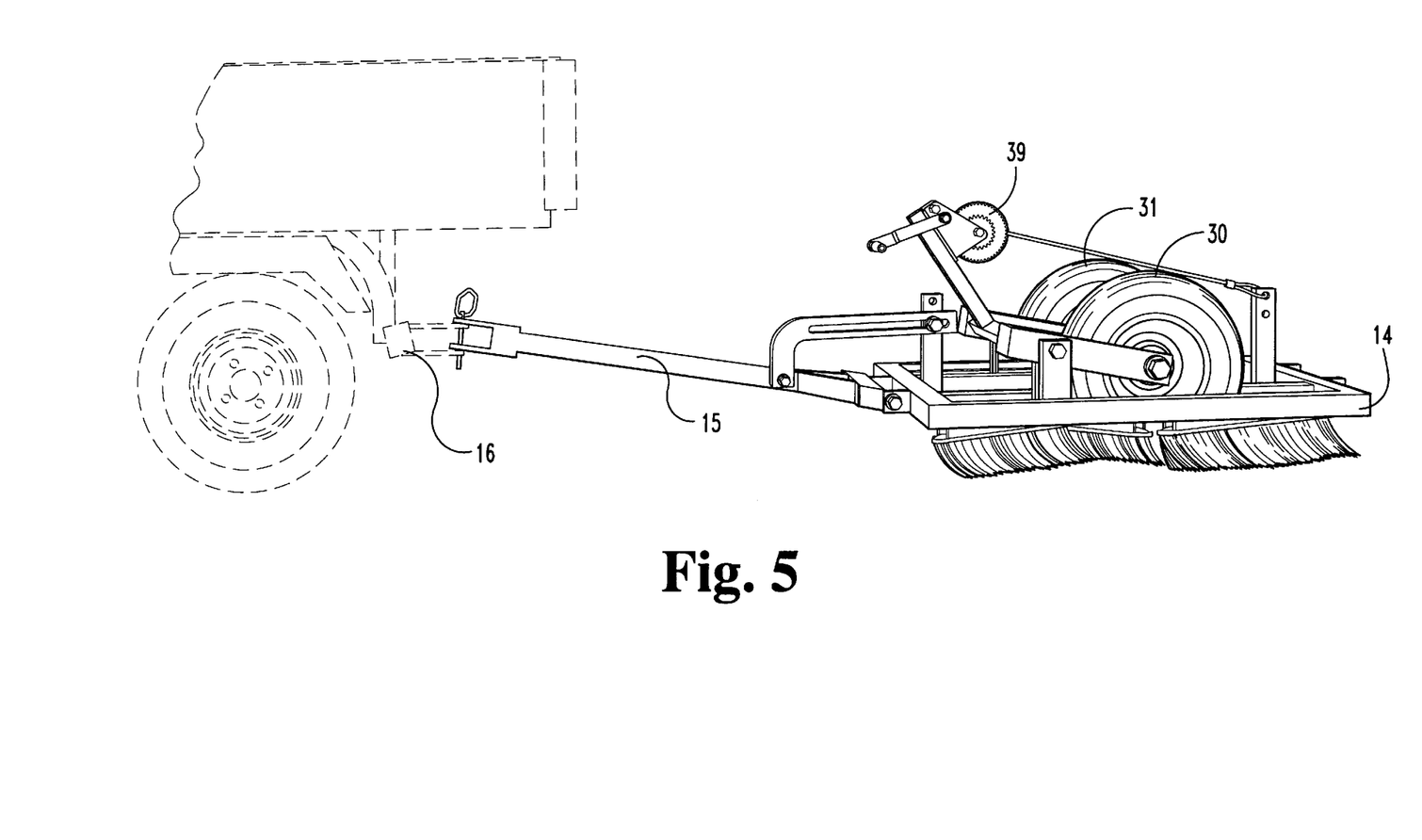
FIG. 5 is a left side view of the brush vehicle of FIG. 1.
Figure 6:
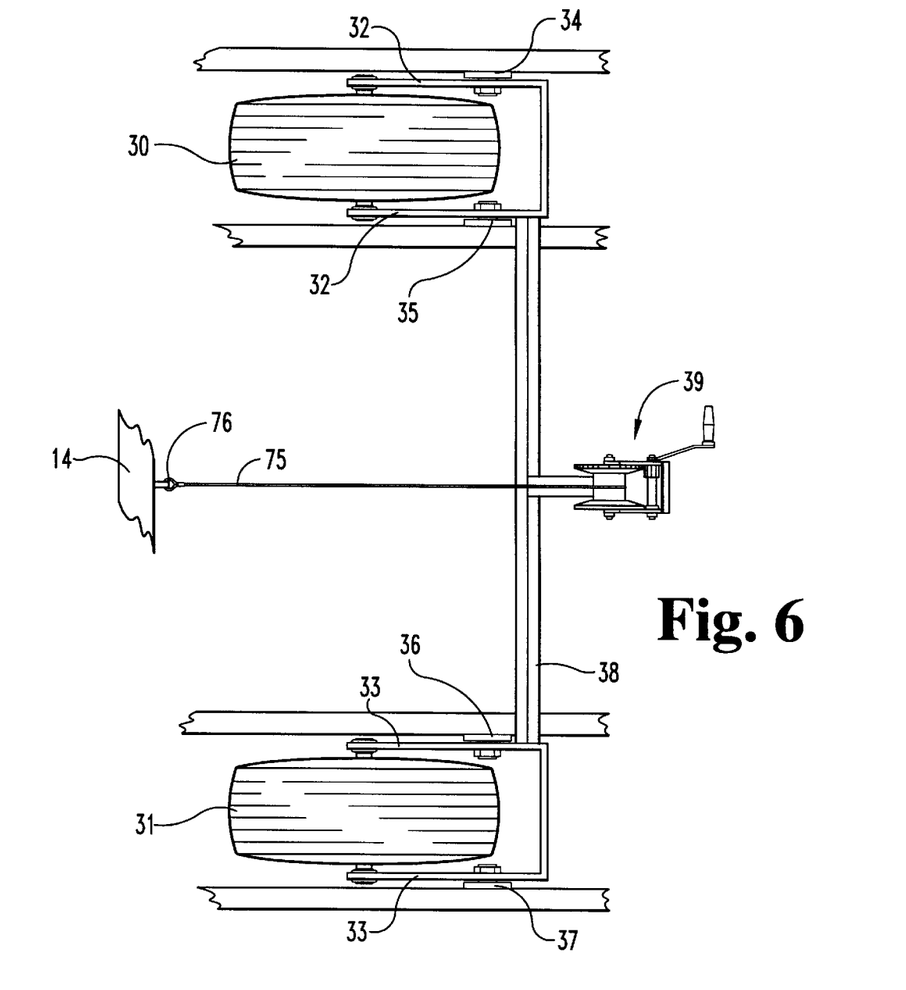
FIG. 6 is a fragmentary top view of the wheel mounting structure for the brush vehicle.

Frame 14 (FIG. 4) includes a pair of end tubes 20 and 21 with opposite ends joined to a front tube 22 and a rear tube 23. Likewise, cross tubes 24–27 are located between and parallel to the end tubes 20 and 21 and have their opposite ends attached to the front tube 22 and rear tube 23. The four corners of frame 14 are mitered to close the corners preventing rust that would normally occur after rain. A pair of wheels 30 and 31 (FIG. 1) are rotatably mounted respectively to a pair of U-shaped frames 32 and 33. Frame 32 is pivotally mounted to a pair of upstanding members 34 and 34 (FIG. 6) mounted respectively to cross members 24 and 25 (FIG. 4). U-shaped frame 33 is pivotally mounted to upstanding members 36 and 37 mounted respectively to cross members 26 and 27. Cross members 24 and 25 are spaced apart to allow wheel 30 and U-shaped frame 32 to move therebetween whereas cross members 26 and 27 are spaced apart to allow wheel 31 and U-shaped frame 33 to move therebetween. Wheels 30 and 31 engage the ground for transport of the brush vehicle with the brushes being spaced apart from the ground whereas both wheels may be raised when in the in-use condition with the brush frame then supported atop the ground by the plurality of brushes.

A yoke is formed by a joining member 38 (FIG. 6) integrally connected to the outer ends of U-shaped frames 32 and 33. A cable winch 39 mounted atop joining member 38 has a cable 75 with its distal end 76 attached to the rear end of frame 14. By cranking the winch, cable 75 is retracted causing the yoke to pivot forcing the wheels downwardly to engage the ground thereby spacing the brushes apart from the ground. By cranking the winch in the opposite direction, cable 75 is extended thereby pivoting U-shaped frames 32 and 33 in the opposite direction causing the wheels to be lifted and allowing the brush frame to be supported on the ground by the brushes.

The brushes are mounted to frame 14 in patterns having an equal number of brushes on both sides of the longitudinal axis 40 (FIG. 4) of brush frame 14 thereby allowing even brush wear and even grass grooming when the vehicle is towed in the direction of arrow 13 (FIG. 1) or in a reverse direction. A pair of brackets 41 and 42 are integrally attached to rear member 23. Likewise, a pair of brackets 43 and 44 are integrally attached to the front member 22 with the brackets being attachable to tow bar 15. The tow bar has a proximal end integrally attached to cross member 45 (FIG. 4) having its opposite ends removably connected to brackets 43 and 44 with the distal end of the tow bar being attached to the hitch 16. In this configuration, vehicle 11 tows frame 14 in the direction of arrow 13 (FIG. 1). Alternatively, the opposite ends of connecting member 45 may be disconnected from brackets 43 and 44 and connected to the rear brackets 41 and 42 with the vehicle frame then being towed in an opposite direction. The operator may therefore periodically change the connection of the tow bar to either the front member 22 or rear member 23 thereby controlling the brush wear. In order to obtain even brush wear, the tow bar should be attached to the front end member 22 and then towed a predetermined number of hours with the tow bar then being reversed and attached to the rear member 23 and towed for the same number of hours.

The brushes are arranged in reverse patterns on the opposite sides of longitudinally axis 40 in order to ensure even grass grooming. For example, the pattern on the left side of axis 40 as viewed in FIG. 4 includes four brushes 46–49 forming a quadrilateral surrounding wheel 30 whereas the pattern on the right side of axis 40 includes brushes 50–53 forming a separate quadrilateral surrounding wheel 31. Both quadrilaterals include a forward extending brush extending to the front corner of the brush frame. That is, brushes 54 and 55 extend perpendicularly respectively from brushes 47 and 52 terminating at the forward corner of brush frame 14. Brushes 46 and 52 extend beyond respectively brushes 49 and 51 to the edge of the frame. Brushes 48 and 50 extend respectively beyond brushes 47, 49 and brushes 51 and 53 with each brush 48 and 50 extending in a diagonal direction from front member 52 to rear member 23. Further, a pair of brushes 56 and 57 extend respectively from brushes 49 and 51 to respectively the rear member 23 and front member 22. Notably, the number of brushes on the left side of the longitudinal axis 40 is the same as the number of brushes on the right side of the axis. Brushes on the left side of axis 40 include brushes 46, 47, 49, 54 and a portion of brushes 56 and 48 totalling six separate brushes whereas the brushes on the right side of the axis 40 include brushes 51, 52, 53, 55 and a portion of brushes 50 and 57, again totalling six separate brushes. Brushes 54, 48, 50, 57, 52 and 55 extend at acute angles from the front end of the vehicle frame towards the rear end and are arranged so that each blade of grass passing beneath frame 14 is contacted by at least three separate brushes providing superior grass grooming and more effective brushing action of sand downwardly between the blades. The pattern of brushes on the left side of axis 40 as well as the pattern of brushes on the right side of the axis include at least three separate brushes along all lines extending parallel to axis 40 from the front end to the rear end of the brush frame in order to ensure that each blade of grass is contacted by the brushes at least three times at the vehicle is moved thereacross. For example, lines 60 and 61 are parallel to axis 40 with a blade of grass passing along line 60 being contacted by brushes 54, 47 and 46 whereas the blade passing along line 61 is contacted brushes 57, 51 and 50.

Figure 7:
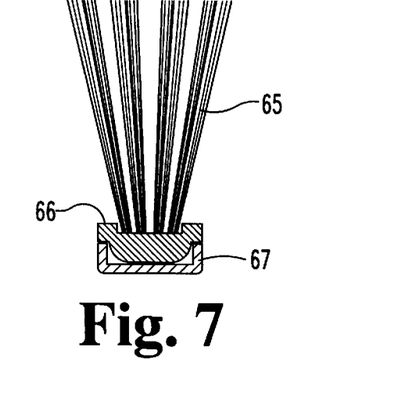
FIG. 7 is an enlarged cross sectional view taken along a line and viewed in the direction of the arrows 7—7 of FIG. 4.

The prior art grass brushes have a tendency to pull to the left or right since a turning moment is generated by the brushes as the brushes are towed across the golf green. The turning moment is generated by the brush pattern being different on both sides of the longitudinal axis of the brush frame or by unequal contact area between the brushes and the ground on both sides of the axis. The brush pattern shown in FIG. 4 minimizes or eliminates the turning moment by equalizing the number of brushes on the left side and right side of the longitudinal axis and by also equalizing the contact area between the brushes and the ground on the left side of axis 40 with the contact area between the brushes and the ground on the right side of the axis. Each individual brush includes a plurality of bristles 65 (FIG. 7) cantileverly mounted to a base 66, in turn, removably mounted by bolts or other conventional fastening devices to a downwardly opening U-shaped channel 67 attached to frame 14.

Figure 2:
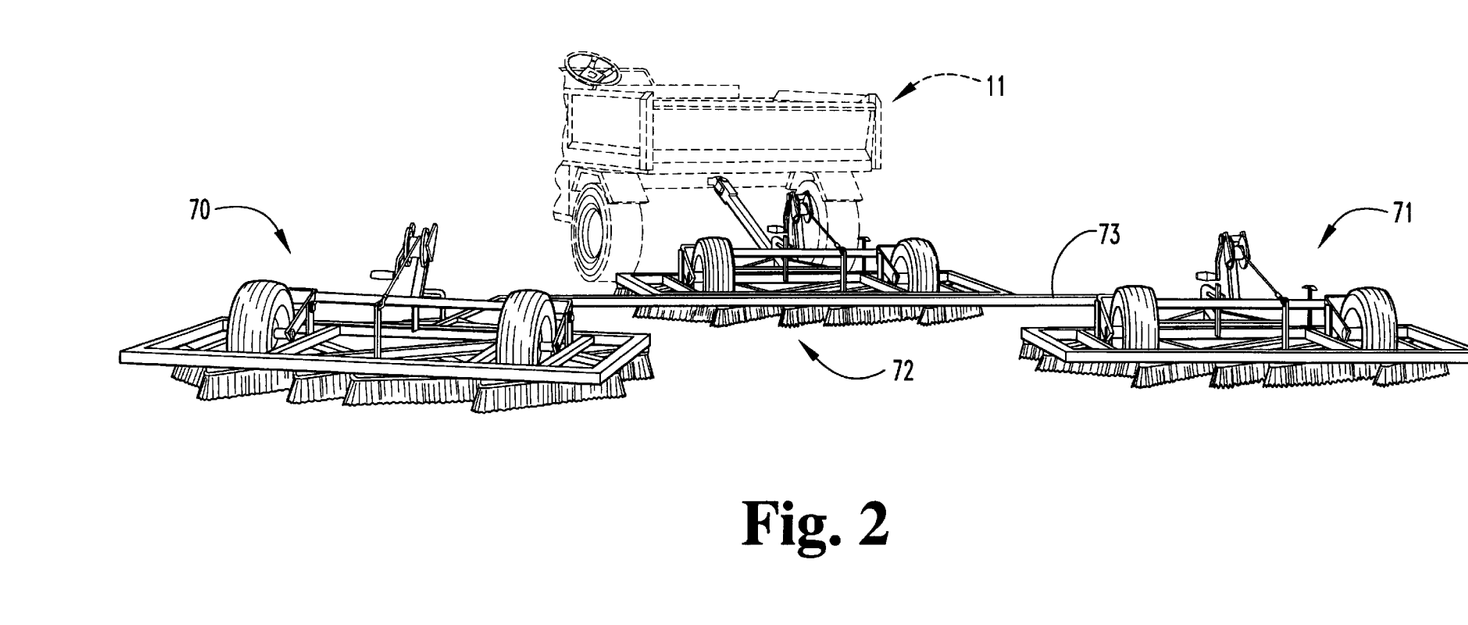
FIG. 2 is a rear view of multiple grass brush vehicles attached to a powered vehicle.

In order to maximize a sweep area, three identical brush vehicles may be connected together. Brush vehicles 70, 71 and 72 (FIG. 2) are identical to the brush vehicle 10 (FIG. 1) previously described. The tow bar of vehicle 72 is connected to the hitch of powered vehicle 11 with an elongated connecting member 73 having opposite ends, in turn, connected to the tow bars of vehicles 70 and 71 with each vehicle 70 and 71 being located outwardly of vehicle 72. Connecting member 73 includes a pair of forwardly extending brackets, in turn, connected to the rear brackets 41 and 42 of the rear of vehicle 72. Since the sweep areas, that is the area beneath each frame of vehicles 70–72 is identical, the total sweep area of vehicles 70–72 equals three times the individual sweep areas.

Figure 3:
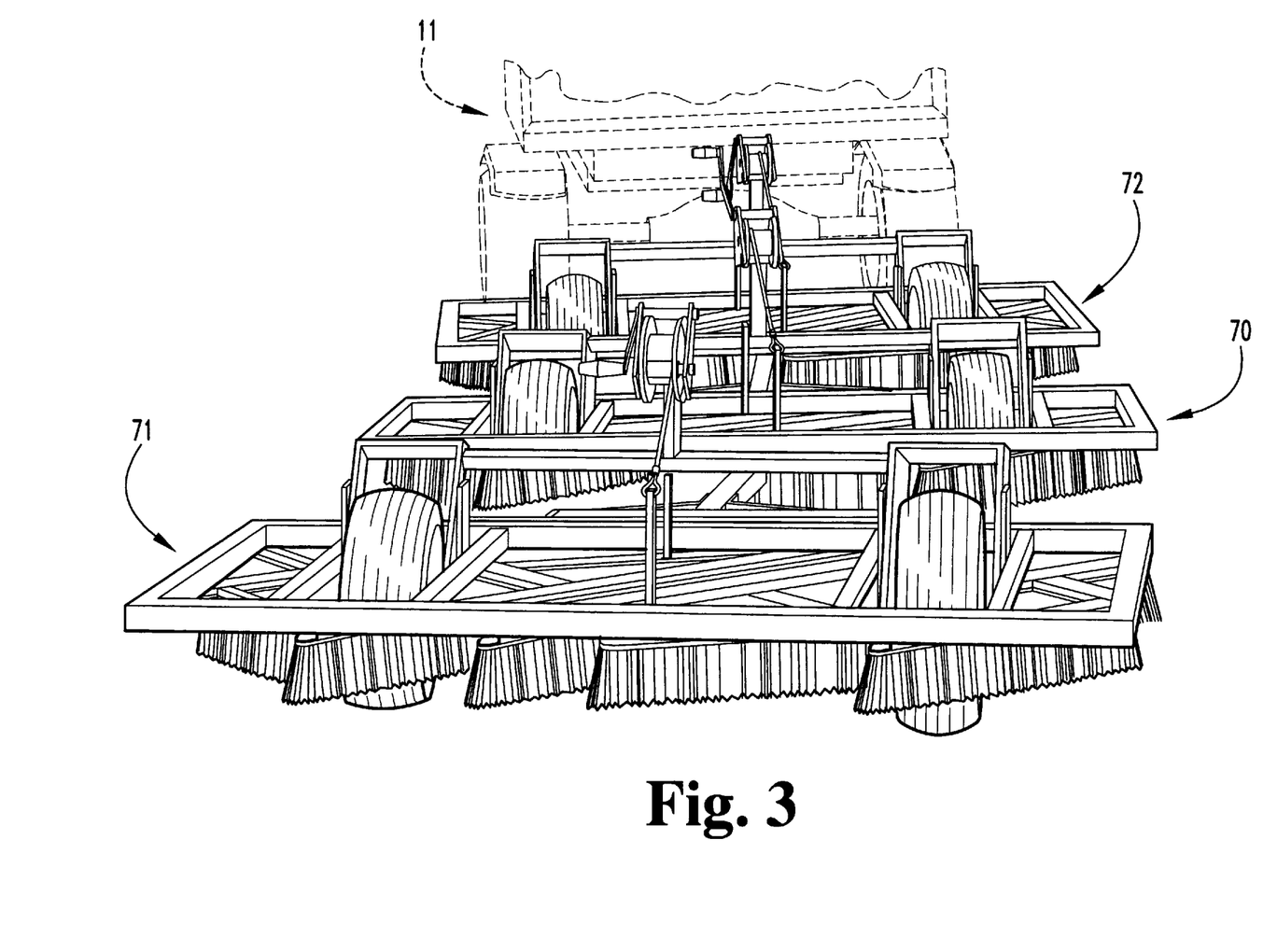
FIG. 3 is a rear view of multiple grass brush vehicles connected together in tandem.

In use, the wheels of vehicles 70–72 are in the upward position thereby allowing each brush vehicle to rest on its brushes atop the grass. Once the brushing or grooming is completed, elongated connecting member 73 is unconnected from vehicles 70–72 with the vehicles then being arranged in tandem or in an in-line single row. That is, the tow bar of vehicle 72 remains attached to vehicle 11 (FIG. 3) with the tow bar of vehicle 70 then being attached to hitch bracket 74 (FIG. 1) located equidistant between brackets 41 and 42 of vehicle 72. Likewise, the tow bar of vehicle 71 is removably attached to the rearwardly extending bracket 74 fixedly mounted to the rear member of vehicle 70. The three vehicles may then be transported with the wheels in the downward position along a narrow golf cart path and across the numerous narrow width bridges typically found on a golf course.

Vehicles 70–73 are identical to that previously described for vehicle 10 and thus includes the same number of brushes on both sides of the longitudinal axis of each vehicle thereby ensuring that even grass grooming and brush wear is achieved as the vehicles are moved in equal directions toward the front or rear of each vehicle.

Powered vehicle 11 may be provided with a conventional receptacle 12 for holding sand with the sand then exiting the rear end 80 (FIG. 1) of the vehicle. When sand is being dropped by vehicle 11, it is desirable to locate the brush vehicle 10 a sufficient distance from vehicle 11. Draw bar has a long position and short position to allow the operator the option of controlling the distance between the tow vehicle 11 and the brushes. The construction of the draw bar is telescopic and includes two bars slidably mounted to each other and secured together by a removable pen extending into each bar. The pen may be removed and the bars adjusted to the appropriate length with the pen then being reinserted through aligned holes.

Figure 8:
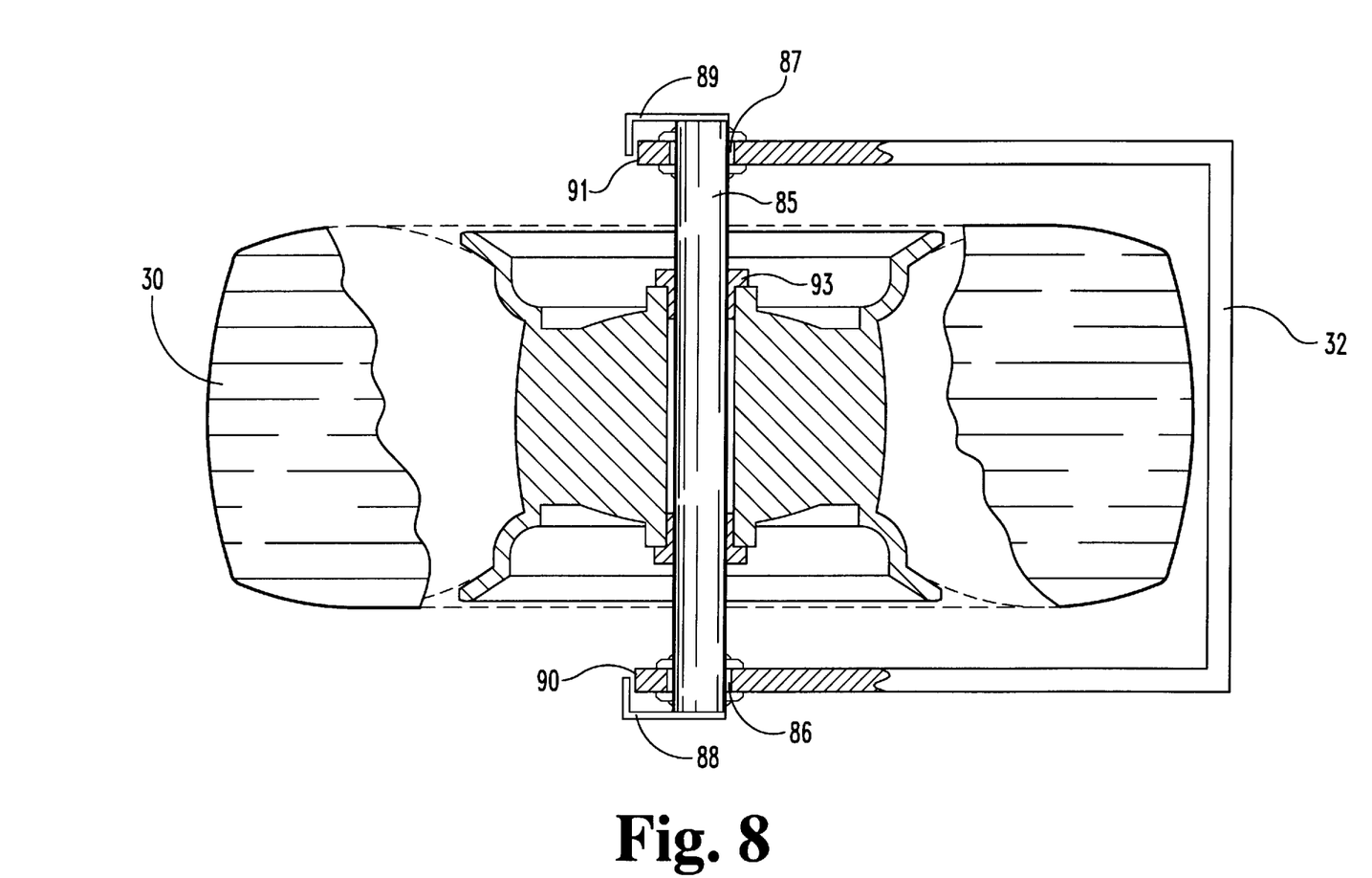
FIG. 8 is an enlarged fragmentary cross sectional view of the wheel axle mounting.

The prior art grass brushes deteriorate with time when sand and water enter the ball bearings used to rotatably support the wheel axle. Eventually, the axles will wobble within the bracket axle holes thereby enlarging the holes and requiring extensive repair of the main frame mounting brackets. I have therefore devised a mounting arrangement for the wheel axles without utilizing ball bearings and further provide an axle limiter to control any wobble movement between the axle and mounting bracket. The design for the mounting of wheel 30 (FIG. 8) will now be described it being understood that an identical description applies to wheel 31. Wheel 30 is mounted by axle 85, in turn, extending through axle holes 86 and 87 of the opposite ends of U-shaped frame 32, in turn, pivotally mounted to the upstanding members 34 and 35. A pair of right angle brackets 88 and 89 are attached to the opposite ends of axle 85 and extend around the distal ends of U-shaped frame 32. Wheel 30 is rotatable upon axle 85. In the event axle 85 should develop any movement relative to the distal ends 90 and 91 of U-shape frame 32, brackets 89 and 88 contact ends 90 and 91 thereby limiting movement of the axle relative to the U-shape bracket 32. Wheel 30 is rotatably mounted by bushing 93. The bushing is a grafoil bushing and includes an oil impregnated steel surface and is manufactured by The Martin Wheel Company, Inc. of Tallmadge, Ohio under Model Description ID-34 (¾"×1⅜").

Figure 9:
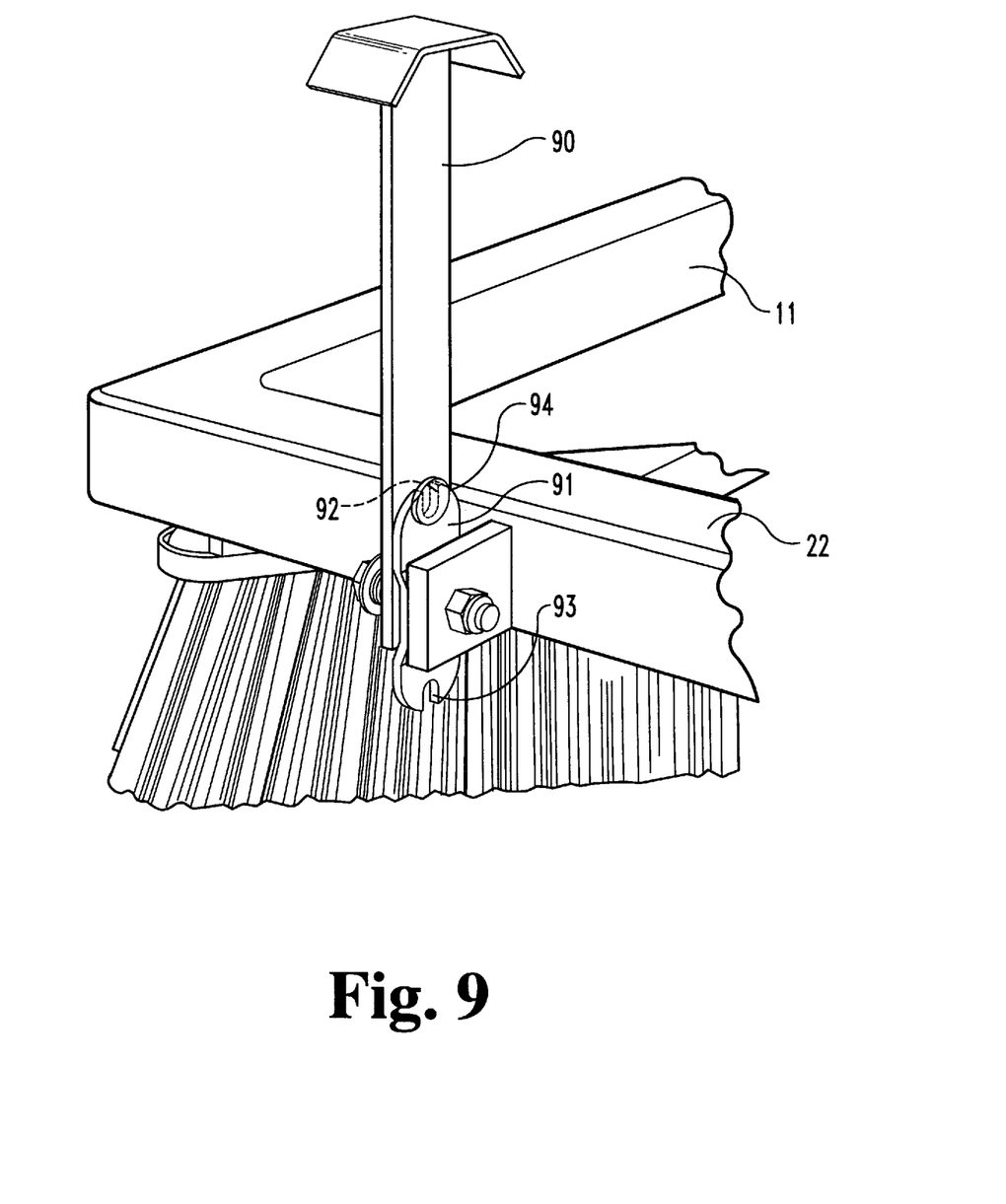
FIG. 9 is a perspective view of the jack for supporting the brush vehicle when not in use.

A jack 90 (FIG. 9) is pivotally mounted to front member 22 to support the brush frame when not attached to the powered vehicle 11. The top end as viewed in FIG. 9 is rounded and may be pivoted down to engage the ground and remove pressure from the brushes. The proximal end of the jack is pivotally mounted between a pair of brackets attached to member 22. A conventional bolt nut combination extends through a slot in the jack to secure the jack to the brackets. Plate 91 is affixed to one of the brackets and has an upwardly opening slot 92 and a downwardly opening slot 93 to engage a button head rod 94 projecting from the jack to hold the jack in the upwardly extending position or in the downwardly extending position. Jack 90 may be moved along its longitudinal axis to disengage slots 92 and 93.

Many variations are contemplated and included in the present invention. For example, in lieu of the mechanical crank to raise and lower the wheels, a linear actuator may be utilized having an electrical motor with a rotatable output shaft, in turn, in meshing engagement with a gear for the rotation of the cable spool.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A brush vehicle for grooming blades of grass comprising:

a first main frame forming a brush holder and including a front end and a rear end with a longitudinal axis extending therebetween, said front end including front tow mounting means having a vertical axis about which said main frame can pivot; and, a plurality of first brushes mounted to said brush holder and extending downwardly engageable with the grass, said brushes arranged in a first pattern on a first side of said longitudinal axis and in a second pattern on a second side of said longitudinal axis opposite of said first side, said first pattern and said second pattern having an equal number of said brushes allowing even brush wear and even grass grooming minimizing turning moments applied to said vehicle about said vertical axis by said grass when said vehicle is moved equally in either direction along said longitudinal axis, said first pattern and said second pattern each include at least three separate brushes along all lines extending parallel to said longitudinal axis which intersect said front end and said rear end to strike each blade of grass beneath said brush holder at least three times as said vehicle is moved thereacross.

2. The vehicle of claim 1 wherein:

said brushes are straight but extend at acute angles from said front end toward said rear end; and further comprising:

a plurality of wheels mounted to said frame each being surrounded by said brushes arranged in separate quadrilaterals;

means for lowering and raising said wheels relative to said frame; and, rear tow mounting means on said rear end.

3. The vehicle of claim 1 and further comprising:

a second main frame forming a second brush holder and including a second front end and a second rear end with a second longitudinal axis extending therebetween;

a plurality of second brushes mounted to said second brush holder and extending downwardly engageable with the grass, said second brushes arranged in a third pattern on a third side of said second axis and in a fourth pattern on a fourth side of said second axis opposite of said third side, said third pattern and said fourth pattern having an equal number of said second brushes allowing even brush wear and even grass grooming when said vehicle is moved equally in either direction along said second axis;

a third main frame forming a third brush holder and including a third front end and a third rear end with a third longitudinal axis extending therebetween;

a plurality of third brushes mounted to said third brush holder and extending downwardly engageable with the grass, said third brushes arranged in a fifth pattern on a fifth side of said third axis and in a sixth pattern on a sixth side of said third axis opposite of said fifth side, said fifth pattern and said sixth pattern having an equal number of said third brushes allowing even brush wear and even grass grooming when said vehicle is moved equally in either direction along said third axis;

mounting means on said first frame, said second frame and said third frame having a transport condition to connect said first frame, said second frame and third frame in a single row in tandem and having a sweeping condition to connect and position said second frame and third frame laterally outward of said first frame providing a sweep area equal to that of said first frame laterally on either side thereof; and, a plurality of wheels on said first frame, said second frame and said third frame contacting ground at all times when in said single row in tandem and when is said sweeping condition.

4. The vehicle of claim 2 and further comprising:

a powered vehicle;

a draw bar including multiple mounting means to position said first main frame behind said powered vehicle; and, a sand box mounted on said powered vehicle to drop sand on the grass with said frame located behind said powered vehicle.

5. A grass brush comprising wherein:

a plurality of wheeled frames including at least a first frame, a second frame and a third frame, each frame including a sweep area therebeneath and each also including a longitudinal axis with a front end and a rear end;

a plurality of brushes mounted to said frames extending down to brushingly engage grass;

mounting means on said frames having a transport condition to connect said frames in a single row in tandem and having a sweeping condition to connect and position at least said second frame and said third frame laterally outward of said first frame providing a sweep area equal to that of said first frame laterally on either side thereof; and, a plurality of wheels mounted to each frame for support thereof; and said brushes on each frame are arranged in a first pattern on a first side of said axis and in a second pattern on a second side of said axis opposite of said first side, on each frame said number of said brushes are equal allowing even brush wear and even grass grooming when moved equally in a forward and rearward direction, said first pattern and said second pattern each include at least three separate brushes along all lines extending from and intersecting said front end and said rear end parallel to said longitudinal axis to strike each blade of grass beneath each frame at least three times as said frames are moved thereacross.

6. The brush of claim 5 and further comprising:

a sand box mounted on said powered vehicle to drop sand on the grass.

7. A golf green and fairway brushing apparatus pullable by a powered vehicle across grass to brush same comprising:

a number of pullable frames each including an individual sweep area thereunder and further each including a front end and a rear end with a longitudinal axis having opposite sides and extending from said front to said rear end;

a plurality of brushes mounted on said frames and extending downward to brush the grass, said brushes each having brush contact area with the grass located therebeneath and being mounted on each frame in a pattern locating equal brush contact area on either side of said axis allowing even grass grooming when said frames are pulled by said front end and pulled by said rear end;

mounting means on said frames having a transport condition to connect said frames in a single row in tandem and having a sweeping condition to connect and position said frames laterally respect to each other to provide a combined sweep area equal to the number of frames times said individual sweep area; and, a plurality of inverted U-shaped channels mounted to said frames and mountingly receiving said brushes.

8. The apparatus of claim 7 and further comprising:

a jack stands mounted on said frames to support said frames when not in use.

9. The apparatus of claim 7 wherein:

said frames include axles mounted thereon with wheels mounted on said axles, said frames include mounting holes receiving said axles which have brackets mounted to ends thereof engaging said frames and limiting movement between said axles and said frames and enlargement of said holes due to improperly rotating axles.

* * * * *